Sept. 8, 1931.  K. W. WAGNER  1,822,182
DUPLEX SYSTEM FOR TELEGRAPH CABLES WITH LOADING COILS
Filed Jan. 16, 1926
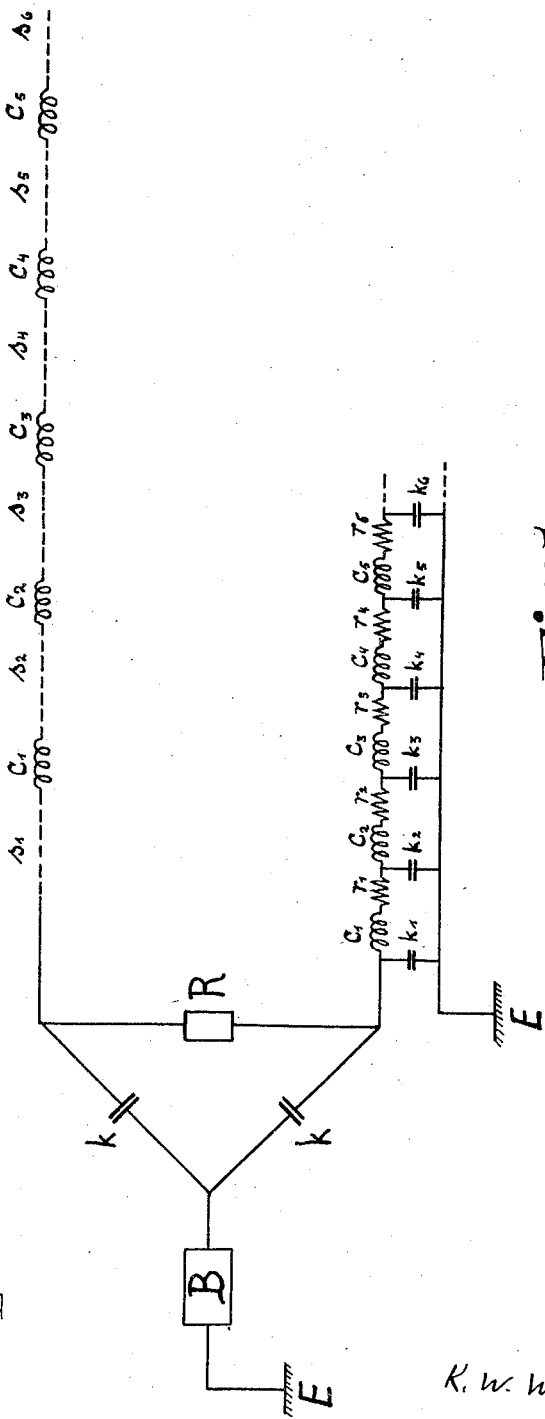
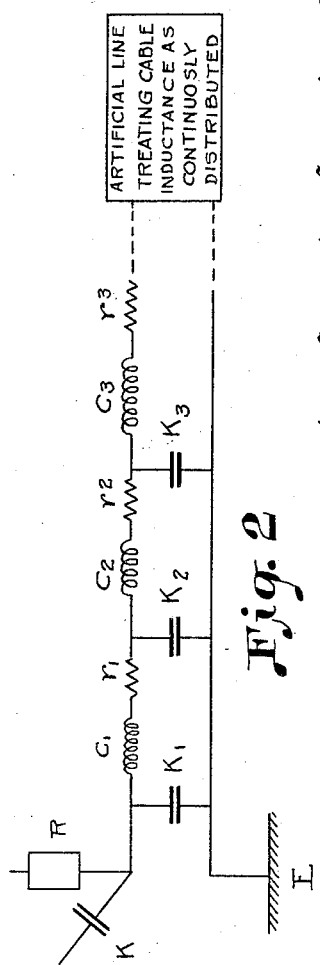
K. W. Wagner
inventor Patented Sept. 8, 1931

1,822,182

UNITED STATES PATENT OFFICE

KARL WILLY WAGNER, OF BERLIN, GERMANY

DUPLEX SYSTEM FOR TELEGRAPH CABLES WITH LOADING COILS

Application filed January 16, 1926, Serial No. 81,823, and in Germany January 17, 1925.

This invention relates to a duplex system for telegraph cables with loading coils.

Telegraph cables provided with loading coils have often been put forward as possessing advantages, but they have not as yet been introduced in practice. One of the reasons why this has not been the case is that duplex operation causes great difficulties in such a cable. It has to be borne in mind that a cable provided with loading coils is a non-homogeneous structure, a condition which becomes much worse if, for some reason or other, a coil loses its efficacy or if, after repairs, the distance between two coils, that is to say the length and consequently the capacity of a coil section, has not the exact predetermined value. It is to be pointed out that it is important to keep this distance absolutely accurate. It is known in telephony how difficult it is to reproduce a Pupin cable. In the case of duplex telegraphy, the requirements as regards the exact reproduction are substantially more rigorous than the requirements in telephone amplifying arrangements. Duplex operation in telegraph cables is impossible if the reproduction is not quite accurate.

According to the present invention, these difficulties are overcome by reproducing not the cable as a whole but each coil section individually and by connecting all these reproductions in series with one another, a coil of exactly the same kind as that contained in the actual cable being inserted between each two such "artificial coil sections". It will be seen that in this way the difficulties referred to at the beginning disappear as it is now possible to balance each individual coil to be inserted into the actual cable with respect to that coil which is to be inserted at the corresponding point in the reproduction. In the case of cable repairs it will only be necessary to ascertain in which coil section the repair has been effected, and if and to what extent the section has been extended. The same alteration is then effected in the corresponding coil section of the reproduction.

A further advantage of the reproduction above described lies therein that it can also be used without alteration if the coil loading of the cable to be reproduced is not uniform; for instance, when the portions of the cable lying near the shore are more weakly or strongly pupinized than the middle portion of the cable.

As the individual coil sections are comparatively short, it will generally be sufficient to reproduce each coil section solely by means of a resistance and a capacity. The artificial cable which is thereby obtained is thus simply a chain conductor the series reactances of which consist of coils and ohmic resistances, whilst the transverse reactances consist of condensers.

In the drawings, Fig. 1 is an arrangement according to the invention.

Fig. 2 is a modified form of the invention.

Such an artificial cable is illustrated in the accompanying drawings in which B is the transmitting battery, $k$ are condensers, R is the receiver and E is the earth. The actual cable with the sections $s_1$, $s_2$, $s_3$ . . . and the coils inserted therein $c_1$, $c_2$, $c_3$ . . . is artificially reproduced by a chain conductor constituted by condensers $k_1$, $k_2$, $k_3$ . . . coils $c_1$, $c_2$, $c_3$ . . . and resistances $r_1$, $r_2$, $r_3$ . . . in such a manner that the condenser $k_1$ has a capacity equal to the capacity of the section $s_1$, the resistance $r_1$ is equal to the resistance of the length of the section $s_1$ and of the coil $c_1$, whilst the coil $c_1$ of the artificial cable is equal to the coil $c_1$ of the actual cable. This also applies to all the other parts of the chain conductor. If this accuracy is not sufficient, the coil sections have to be reproduced by multi-link chain conductors or by Muirhead's artificial cables of usual construction.

It is known that the reproduction of the beginning of the cable has to be the most careful one. Accordingly the more accurate reproduction just mentioned is required only for the first coil sections; the subsequent coil sections may be reproduced by a simple chain conductor of the kind first referred to. In certain cases it may be sufficient to adopt the form of reproduction according to the present invention only as regards a portion of the cable, for instance ¼ of the cable length; the remainder may then be reproduced as if the inductivity were distributed continuously over the cable as shown in Fig. 2.

What I claim is:

1. Duplex arrangement for telegraph cables having loading coils along the whole cable and comprising an artificial line, the coils and coil sections of the beginning of the cable being reproduced individually in the artificial line, whilst the remainder of the cable is reproduced in such a manner as if the inductivity were distributed uniformly over the cable.

2. Duplex arrangement for telegraph cables having loading coils and comprising an artificial line, in which latter line the coils are reproduced individually, while each cable section between two consecutive coils is reproduced by network having the same total capacity to earth as the corresponding section of the cable.

3. Duplex arrangement as claimed in claim 2 and in which a number of portions at the beginning of a cable are reproduced more accurately than the other portions thereof, in such a manner that the accuracy of the reproduction decreases in steps towards the far end of the cable.

In testimony whereof I have signed my name to this specification.

KARL WILLY WAGNER.